May 11, 1965  G. H. RIBBLE, JR  3,183,047
BEARING SUPPORT FOR SPLIT CASING PUMP
Filed Oct. 25, 1962
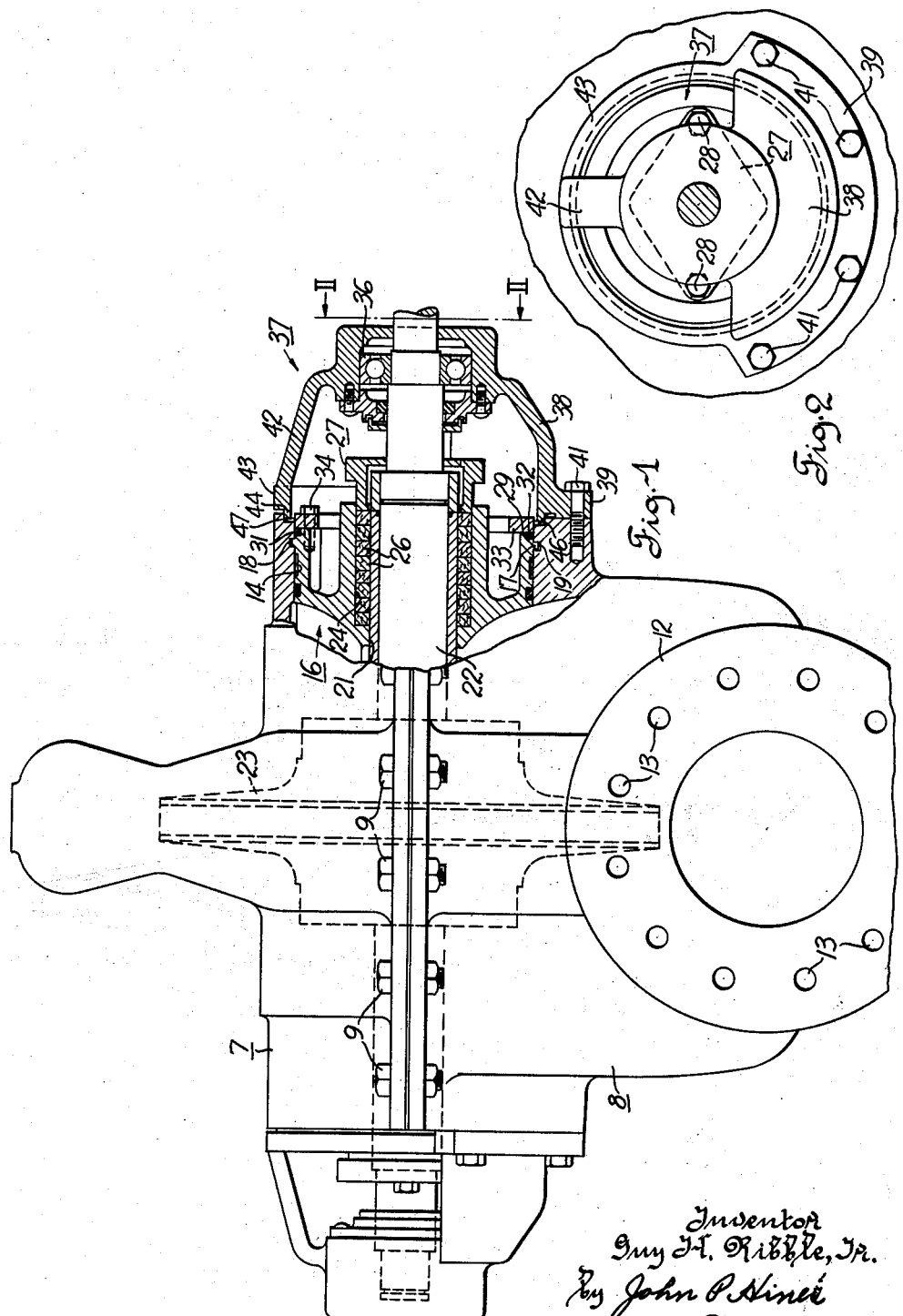

United States Patent Office 3,183,047
Patented May 11, 1965

3,183,047
BEARING SUPPORT FOR SPLIT CASING PUMP
Guy H. Ribble, Jr., Brookfield, Wis., assignor to Allis-Chalmers Manufacturing Company, Milwaukee, Wis.
Filed Oct. 25, 1962, Ser. No. 233,072
7 Claims. (Cl. 308—22)

This invention pertains to pumps in general and more particularly to centrifugal pumps of the split casing type and to a novel means for connecting the pump shaft bearings to the casing.

Pumps of this character are provided with an impeller positioned in a pumping chamber within the pump casing. The impeller is supported by a shaft extending longitudinally through the casing and conventionally in line with the plane of the longitudinal casing joint. The casing is provided with aligned end bores which are closed by end closures attached to the pump casing. A fluid seal is provided between the end closures and the casing end bores and the end closures have shaft bores therethrough which contain the shaft packing. It is common practice to provide shaft bearings on the outboard sides or ends of the end closures. The shaft bearings are supported in a bearing housing which is conventionally connected to the end closures.

Pumps of this type are split along a longitudinal joint so that the upper casing section can be removed from the lower casing section to facilitate inspection of the pump. It is desirable that as many of the internal elements of the pump which require periodic inspection be accessible without disturbing the alignment of these and other elements of the pump which do not require such periodic inspection. Depending upon the type of material being pumped, the pump impeller, the fluid passages and the fluid seals should be periodically inspected. However, the shaft bearings do not as a rule require much attention and it is, therefore, desirable to be able to remove portions of the pump without disturbing the critical shaft bearing alignment.

It is, therefore, a general object of the subject invention to provide a pump of the hereinbefore described type with a shaft bearing housing connection which permits inspection and repair of a number of elements of the pump without disturbing the critical shaft bearing alignment.

A further object of the subject invention is to provide a pump of the hereinbefore described type wherein the shaft bearings are critically aligned relative to finished surfaces on both pump casing sections but are connected to only one casing section.

An additional object of the subject invention is to provide a pump of the hereinbefore described type whereing differential thermal expansion and differential distortion due to fluid pressure between the casing sections will not affect the shaft bearing alignment.

These and other objects of the subject invention will become more fully apparent as the following description is read in light of the attached drawing, wherein:

FIG. 1 is a side elevation, partly in section, of a pump constructed in accordance with the invention; and FIG. 2 is a partial end view of the pump taken along the lines II—II of FIG. 1.

Referring to the drawing and particularly FIG. 1, the pump is comprised of an upper casing section 7 and a lower casing section 8. Each casing section may be provided with a longitudinally disposed flange having aligned bolt holes therethrough in which are received bolts 9 releasably connecting the casing sections together. A seal gasket 11 is provided between the casing sections to seal the interior of the pump along the longitudinal joint from the atmosphere. The pump is provided with a conventional intake flange 12 which may be cast as an integral part of the lower casing section 8. This flange may be provided with circumferentially spaced mounting holes 13.

Since both ends of the pump are substantially identical, only one end has been broken away to show the construction thereof. Each end of the pump is provided with an end bore 14 into which is received an end closure generally designated 16. The end closure may be connected to the pump casing in any conventional manner and in this particular arrangement the end closure is provided with an annular tongue 17 on the peripheral surface thereof which fits into aligned annular grooves 18 and 19 on the inner peripheral surface of each casing section 7 and 8. A shaft bore 21 through the end closure 16 receives the pump shaft 22 to which is rigidly connected a conventional pump impeller 23. A counterbore 24 in the end closure coaxial with the shaft bore 21 receives shaft packing 26. A packing gland 27 is releasably connected to the outer end of the end closure 16 in any conventional manner such as by cap screws 28.

The outer end of the end closure 16 is provided with an annular shoulder 29 about the periphery thereof. When the end closure is positioned in the end bore 14, as is shown in FIG. 1, this annular shoulder 29 and the inner peripheral surface of the casing sections 7 and 8 define an annular groove 31 which is open to the atmosphere from the end of the pump. An O-ring 32 is inserted into this annular groove and a pressure ring 33 is then rigidly connected to the end closure to force the O-ring into engagement with the joint between the casing end bore and the end closure shoulder. The ring 33 may be attached to the end closure in any conventional manner and is herein shown as being connected thereto by three cap screws 34 which are turned into threaded bores provided in the outer face of the end closure.

A shaft bearing 36 is positioned on the axially outer end of the end closure 16 and is rigidly carried in a bearing housing generally designated 37. The bearing housing 37 is provided with an arcuately shaped lower support leg 38 having a semiannular mounting flange 39 at the end thereof. The mounting flange 39 is provided with a number of circumferentially spaced bolt holes which are alignable with internally threaded bores in the outer end of the lower casing section 8. Cap screws 41 releasably and rigidly connect the bearing housing 37 to the pump lower casing section 8. The bearing housing is also provided with an upper leg 42. The upper and lower legs 42 and 38, respectively, are connected by an annular flange 43 which is, in effect, a continuation of the mounting flange 39. The annular flange 43 has an annular axially extending lip 44 thereon which fits into an annular recess 46 in the outer ends of the casing sections 7 and 8. The lip 44 and recess 46 are machined to a close tolerance so that when the lip is fitted into the recess the bearing 36 is critically aligned with the casing end bores 14.

It should be noted that the bearing housing, although critically aligned with reference to both casing sections by means of the annular lip 44 and annular recess 46, is only attached to the lower casing section 8. The upper casing section 7 can therefore be removed without removing or loosening the bearing attaching screws 41 and without in any way interfering with the critical shaft bearing alignment. This permits easy access to the internal portions of the pump simply by removing the longitudinal joint bolts 9.

It should also be noted that the bearing housing is located relative to a radially inwardly directed annular surface of the recess 46. This permits an axial clearance 47 between the casing sections 7 and 8 and the bearing housing annular flange 43. This is a desirable feature because in most split casing pumps the upper casing section is a much lighter structure than the lower casing section and, therefore, more susceptible to expansion and contraction due to changing thermal conditions and more susceptible to deformation due to fluid pressure within the pump. With this axial clearance 47 the upper casing section may expand relative to the lower casing section without contacting the bearing housing and causing a misalignment of the shaft bearing 36.

Although only one embodiment of the subject invention has been described and shown herein, it will be obvious to those skilled in the art after reading this disclosure that various modifications of the invention can be employed which incorporate the spirit of the invention disclosed and it is intended to cover such modifications as come within a reasonable interpretation of the claims appended hereto.

Having now particularly described and ascertained the nature of my said invention and the manner in which it is to be performed, I declare that what I claim is:

1. In a pump the combination comprising: a pump casing having aligned end bores, said casing constructed of two sections releasably connected along a longitudinal joint; a rotatable shaft extending through said aligned end bores; a bearing housing having a first arm releasably and rigidly connected to one of said casing sections, and a second arm spaced from said first arm having a flange thereon with a radially outwardly facing surface contacting the radially inwardly facing surface of the other of said casing sections, said facing surfaces being free of positive retaining means; and a bearing contained within said housing and rotatably supporting said shaft.

2. In a pump the combination comprising: a pump casing having aligned end bores, said casing constructed of two sections releasably connected along a longitudinal joint; a pair of cylindrical end closures carried in and closing said end bores, said end closures having aligned shaft bores; a rotatable shaft extending through said aligned shaft bores; a radially inwardly facing shoulder in the end of one of said casing sections; a bearing housing having a first arm releasably and rigidly connected to the other of said casing sections and a second arm spaced from said first arm having a flange thereon with a radially outwardly facing surface contacting said radially inwardly facing shoulder, said surface and said shoulder being free of positive retaining means; and a bearing contained within said housing and rotatably supporting said shaft.

3. In a pump the combination comprising: a casing having aligned end bores, said casing constructed of two sections releasably connected along a longitudinal joint; a rotatable shaft extending through said aligned end bores; a bearing housing having a pair of spaced arms; an annular flange connecting the free ends of said arms and having a radially outwardly facing surface contacting the radially inwardly facing surface of said casing; means releasably and rigidly connecting one of said arms to one of said sections, the other of said sections and said bearing housing being free of positive retaining means; and a bearing contained within said housing and rotatably supporting said shaft.

4. In a pump the combination comprising: a pump casing having aligned end bores, said casing constructed of two sections releasably connected along a longitudinal joint; a pair of cylindrical end closures carried in and closing said end bores, said end closures having aligned shaft bores; a rotatable shaft extending through said aligned shaft bores; a radially inwardly facing arcuate shoulder in the ends of each of said casing sections constructed and arranged to form a continuous annular shoulder when said casing sections are connected together; a bearing housing having a pair of spaced arms; an annular flange connecting the free ends of said arms and having a radially outwardly facing surface contacting said radially inwardly facing annular shoulder; means releasably and rigidly connecting one of said arms to one of said casing sections, the other of said casing sections and said bearing housing being free of positive retaining means; and a bearing contained within said housing and rotatably supporting said shaft.

5. In a pump the combination comprising: a pump casing having aligned end bores, said casing constructed of two sections releasably connected along a longitudinal joint; a rotatable shaft extending through said end bores; a bearing housing having a pair of spaced arms; an annular flange connecting the free ends of said arms and having a radially outwardly facing surface contacting the radially inwardly facing surface of one of said bores and having an axially inwardly facing surface contacting the axially outwardly facing end surface of one of said casing sections and being spaced from the axially outwardly facing end surface of the other of said casing sections; means releasably and rigidly connecting one of said arms to said one of said sections, said other of said casing sections and said bearing housing being free of positive retaining means; and a bearing contained within said housing and rotatably supporting said shaft.

6. In a pump the combination comprising: a pump casing having aligned end bores, said casing constructed of two sections releasably connected along a longitudinal joint; a pair of cylindrical end closures carried in and closing said end bores, said end closures having aligned shaft bores; a rotatable shaft extending through said aligned shaft bores; a shoulder in the end of one of said casing sections, said shoulder having a radially inwardly facing surface and an axially outwardly facing surface; a bearing housing having a first arm releasably and rigidly connected to the other of said casing sections and a second arm spaced from said first arm having a flange thereon with a radially outwardly facing surface and an axially inwardly facing surface, said second arm and said casing being free of positive retaining means, said radially outwardly facing surface contacting said radially inwardly facing surface and said axially inwardly facing surface being spaced from said axially outwardly facing surface to permit relative axially sliding movement between said one of said sections and said second arm; and a bearing contained within said housing and rotatably supporting said shaft.

7. In a pump the combination comprising: a pump casing having aligned end bores, said casing constructed of two sections releasably connected along a longitudinal joint; a pair of cylindrical end closures carried in and closing said end bores, said end closures having aligned shaft bores; a rotatable shaft extending through said aligned shaft bores; an arcuate shoulder in the ends of one of said casing sections; a bearing housing having an arcuate flange thereon constructed and arranged to coact with said arcuate shoulder to accurately position said bearing housing relative to said shaft bores; means releasably and rigidly connecting said bearing housing to said one of said casing sections, the other of said casing sections and said bearing housing being free of positive retaining means; and a bearing contained within said housing and rotatably supporting said shaft.

References Cited by the Examiner

UNITED STATES PATENTS

| 1,089,770 | 3/14 | Kerr | 103—88 |
| 1,545,608 | 7/25 | Schmidt et al. | 103—104 |
| 2,287,397 | 6/42 | Rupp | 103—104 |

FRANK SUSKO, *Primary Examiner.*